United States Patent
Pecka et al.

(10) Patent No.: US 10,484,353 B2
(45) Date of Patent: Nov. 19, 2019

(54) MULTIPLE RECIPIENT MESSAGE ENCRYPTION

(71) Applicant: Red Hat, Inc, Raleigh, NC (US)

(72) Inventors: Petr Pecka, Brno (CZ); Pavel Macik, Brno (CZ)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 14/608,983

(22) Filed: Jan. 29, 2015

(65) Prior Publication Data

US 2016/0226844 A1    Aug. 4, 2016

(51) Int. Cl.
H04L 29/06    (2006.01)
H04L 12/58    (2006.01)

(52) U.S. Cl.
CPC ............ H04L 63/061 (2013.01); H04L 51/08 (2013.01); H04L 51/12 (2013.01); H04L 63/0428 (2013.01); *H04L 63/062* (2013.01); *H04L 63/065* (2013.01)

(58) Field of Classification Search
CPC ....... H04L 63/061; H04L 51/08; H04L 51/12; H04L 63/0428; H04L 63/062; H04L 63/065
See application file for complete search history.

(56) References Cited

U.S. PATENT DOCUMENTS

| | | | |
|---|---|---|---|
| 5,787,175 A * | 7/1998 | Carter | G06F 21/6209 707/999.008 |
| 6,192,396 B1 | 2/2001 | Kohler | |
| 6,636,965 B1 | 10/2003 | Beyda et al. | |
| 6,912,656 B1 * | 6/2005 | Perlman | H04L 9/0825 709/206 |
| 6,963,971 B1 * | 11/2005 | Bush | H04L 9/0894 713/153 |
| 7,458,102 B2 * | 11/2008 | Rogers | H04L 29/06 713/158 |
| 7,529,712 B2 * | 5/2009 | Heaven | G06F 21/10 705/51 |
| 7,672,999 B2 | 3/2010 | Basson et al. | |

(Continued)

FOREIGN PATENT DOCUMENTS

| EP | 2157725 A1 * | 2/2010 | ............ H04L 9/088 |
|---|---|---|---|
| EP | 2157725 A1 * | 2/2010 | ............ H04L 9/088 |

OTHER PUBLICATIONS

NPL Search—Google Scholar (Year: 2019).*

(Continued)

*Primary Examiner* — Samson B Lemma
*Assistant Examiner* — Richard W Cruz-Franqui
(74) *Attorney, Agent, or Firm* — Haynes and Boone LLP (57) ABSTRACT

A method performed by a computing system includes receiving instructions from a user to divide content of a message into a plurality of parts, associating a part identifier with each of the plurality of parts, encrypting each of the plurality of parts with a different key, receiving, from the user, a list of recipients of the message and access privileges associated with each recipient in the list, the access privileges indicating which of the plurality of parts each recipient is authorized to access, transmitting the message to each of the recipients, and transmitting the access privilege data, the encryption keys for each of the parts, and the part identifiers for each of the parts to a security authority.

18 Claims, 6 Drawing Sheets

(56) References Cited

U.S. PATENT DOCUMENTS

| | | | | | |
|---|---|---|---|---|---|
| 7,707,642 | B1* | 4/2010 | Herbach | ............ | G06F 21/6227 726/27 |
| 7,747,692 | B2* | 6/2010 | Larsen | ................ | G06Q 10/107 709/203 |
| 7,974,411 | B2* | 7/2011 | Krishnapuram | .... | G06F 21/6245 380/239 |
| 7,987,511 | B2* | 7/2011 | Brown | ................... | H04L 63/04 380/239 |
| 8,484,747 | B2* | 7/2013 | Bhide | ..................... | H04L 51/00 715/271 |
| 8,631,460 | B2* | 1/2014 | Shea | ..................... | H04L 63/061 713/153 |
| 8,959,482 | B2* | 2/2015 | Bhogal | ............... | G06F 9/44505 717/120 |
| 9,147,080 | B2* | 9/2015 | So | ........................ | G06F 21/6218 |
| 2003/0149758 | A1* | 8/2003 | Riche | ................... | H04L 63/104 709/223 |
| 2004/0210838 | A1* | 10/2004 | Wason | .................... | G06F 21/00 715/209 |
| 2007/0219915 | A1* | 9/2007 | Hatano | ................ | H04L 9/0825 705/57 |
| 2007/0255789 | A1* | 11/2007 | Buchheit | ............. | G06Q 10/107 709/206 |
| 2009/0116643 | A1* | 5/2009 | Hatano | ................ | H04N 1/4486 380/59 |
| 2009/0214034 | A1* | 8/2009 | Mehrotra | ............ | G06Q 10/107 380/255 |
| 2009/0282493 | A1* | 11/2009 | Bhide | ................... | H04L 63/105 726/28 |
| 2010/0046749 | A1* | 2/2010 | Hatano | ................... | H04L 9/088 380/44 |
| 2013/0212707 | A1* | 8/2013 | Donahue | ............. | G06F 21/6218 726/29 |
| 2014/0164436 | A1* | 6/2014 | Hayakawa | ............ | G06F 21/604 707/783 |
| 2015/0135059 | A1* | 5/2015 | Liang | ................... | G06F 17/2247 715/234 |
| 2015/0264111 | A1* | 9/2015 | Aleksandrov | ........... | H04L 51/08 726/4 |
| 2016/0094528 | A1* | 3/2016 | Gordon | .................. | H04L 63/08 726/7 |
| 2016/0226844 | A1* | 8/2016 | Pecka | ................... | H04L 63/061 |

OTHER PUBLICATIONS

"*Use Mail Merge to Create and Print Letters and Other Documents*" http://office.microsoft.com/en-001/word-help/use-mail-merge-to-create-and-print-letters-and-other-documents-HA101857701.aspx.

"*Mail Merge with Contacts Group*" https://iworkautomation.com/pages/examples-mail-merge.html.

Alexander Bergmann. "*Reviews for Mail Merge*" https://addons.mozilla.org/en-US/thunderbird/addon/mail-merge/reviews/.

\* cited by examiner

MULTIPLE RECIPIENT MESSAGE ENCRYPTION

SUMMARY

A method performed by a computing system includes receiving instructions from a user to divide content of a message into a plurality of parts, associating a part identifier with each of the plurality of parts, encrypting each of the plurality of parts with a different key, receiving, from the user, a list of recipients of the message and access privileges associated with each recipient in the list, the access privileges indicating which of the plurality of parts each recipient is authorized to access, transmitting the message to each of the recipients, and transmitting the access privilege data, the encryption keys for each of the parts, and the part identifiers for each of the parts to a security authority.

A method performed by a computing system includes receiving an encryption key for each of a plurality of parts of an encrypted message, the encrypted message having a plurality of recipients, receiving a part identifier for each of the plurality of parts of the encrypted message, receiving access privileges for a first recipient of the plurality of recipients, the access privileges for the first recipient identifying which parts of the encrypted message the first recipient is authorized to access, and receiving, from the first recipient, a request for the encryption key for a first part of the plurality of parts from the encrypted message.

A method performed by a computing system includes receiving from a user, a plurality of content parts of a message, associating with each of the plurality of content parts, a part identifier, associating with each of the plurality of content parts, a different encryption key, receiving, from the user, a list of recipients of the message and access privileges associated with each recipient in the list, the access privileges indicating which of the plurality of content parts each recipient is authorized to access, transmitting the message to a server, and transmitting the access privilege data, the encryption keys for each of the parts, and the part identifiers for each of the parts to a security authority.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

According to principles described herein, a user can divide a message, such as an email, into multiple parts. Each part is encrypted with a different key and is assigned a part identifier. The encrypted message is then sent to multiple recipients. Additionally, the key for each part and the identifier for each part are sent to a security authority. Additionally, the sender provides the security authority with access privileges for each of the recipients. The access privileges define which of the parts of the message a particular recipient is authorized to access.

When a recipient receives the encrypted message, he or she has to decrypt the message before it can be viewed. To do this, the recipient requests the key for a particular part of the message from the security authority. After validating the recipient, the security authority uses the access privileges for that recipient to determine if that recipient is authorized to access the part for which the key is being requested. If the recipient is authorized to view that part, then the security authority will provide the recipient with the proper key. If that recipient is not authorized to access that part, then the request for the key will be denied.

Figure 1:
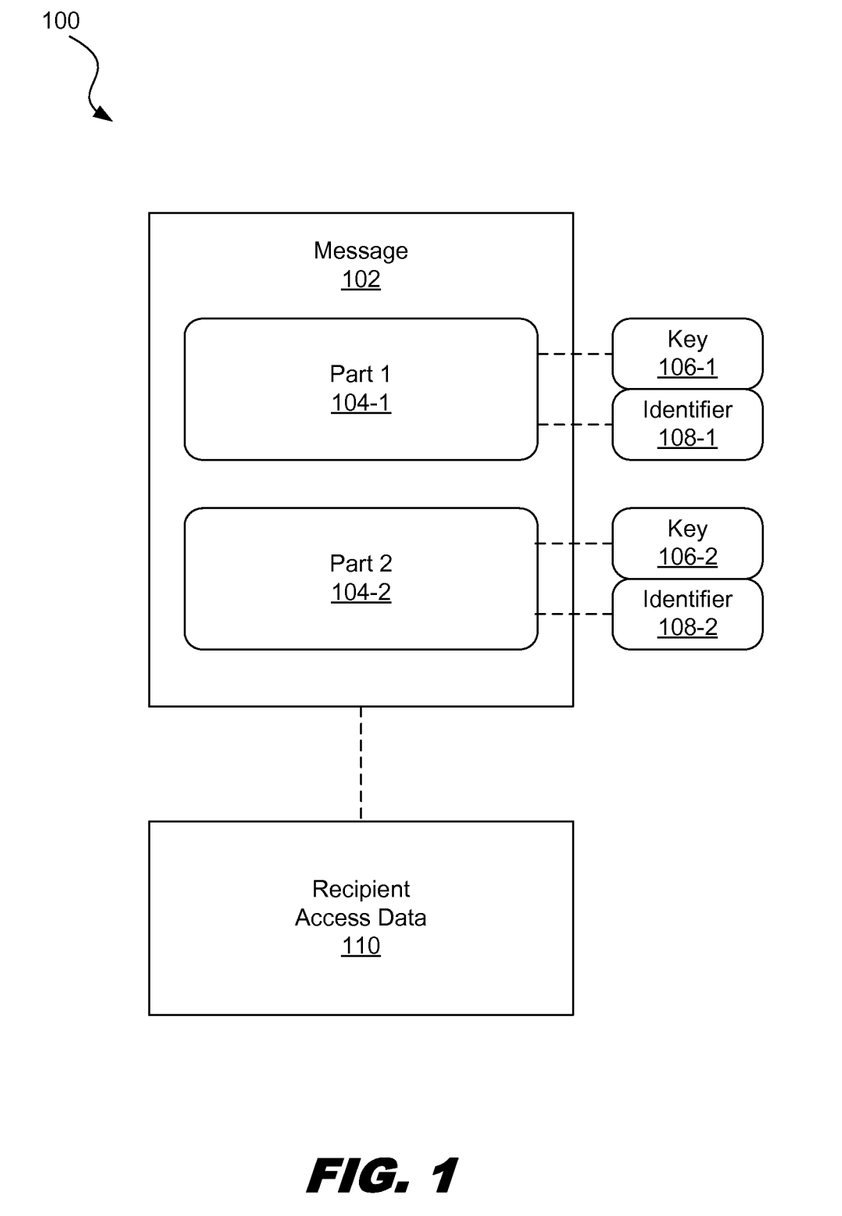
FIG. 1 is a diagram showing illustrative parts of a message that can be separately encrypted, according to one example of principles described herein.

FIG. 1 is a diagram showing illustrative parts of a message that can be separately encrypted. According to the present example, a message 102 is divided into multiple parts 104, each part 104 being associated with a key 106 and an identifier 108. The message 102 is also associated with recipient access data 110.

The message 102 is a set of data that is transmitted from a sender to a user. For example, the message may be transmitted by a computing device associated with a first user to multiple computing devices associated with other users. The message 102 may include text, audio files, video files, images, and other forms of media. The message 102 may be sent using various protocols and formats. For example, the message 102 may be an email. The message 102 may also be an instant message or a text message using Short Message Service (SMS).

The content of the message 102 may be divided into multiple parts 104. The content may include the text of the message as well as any audio, video, image, or other type of media file associated with the message. Such files may be embedded within the body of the message or be configured as attachments. The division into parts 104 may be done by the sender of the message 102. In some examples, if the author is different than the sender, the author may divide the message into parts 104. Parts 104 can be defined in a variety of ways. For example, the message may include several paragraphs, each paragraph being assigned to a different part 104. If the message includes files as attachments, then a single attachment or a set of attachments may be defined as a part 104. In some examples, the message 102 includes images along with the text. An image may be defined as a part 104.

Each part is encrypted and is thus associated with a key. The key 106 is used to decrypt the encrypted part 104 of the message 102. In some examples, a symmetric encryption mechanism is used and thus the key used to encrypt a part 104 of the message 102 is the same as the key used to decrypt that part of the message. In some cases, an asymmetric encryption mechanism, such as public-key cryptography, is used to encrypt each part and thus the key 106 used to decrypt the encrypted part 104 of the message 102.

Different parts 104 of a message are encrypted differently and thus have a different key 106. For example, part 1 104-1 may be encrypted separately from part 2 104-2. Thus, part 1 104-1 will be associated with a different key 106-1 than the key 106-2 associated with part 2 104-2.

Each part 104 is associated with an identifier 108 that identifies that part 104. The identifier 108 is used to reference a particular part 104. Thus, the identifier 108 is unique. For example, identifier 108-1 uniquely identifies part 1 104-1 and identifier 108-2 uniquely identifies part 2 104-2. When a recipient of the message wishes to decrypt a particular part 104 of the message 102, the recipient can reference that part 104 using the identifier 108. The identifier 108 may be, for example, an alpha-numeric value that is generated and assigned to a particular part 104.

The recipient access data 110 is a list of recipients and the access privileges for those recipients. For example, the recipient access data 110 may indicate that a first recipient has access to part 1 104-1 but not part 2 104-2. The recipient access data 110 may also indicate that a second recipient has access to part 2 104-2 but not part 1 104-1. A third recipient may have access to both parts 104.

Figure 2:
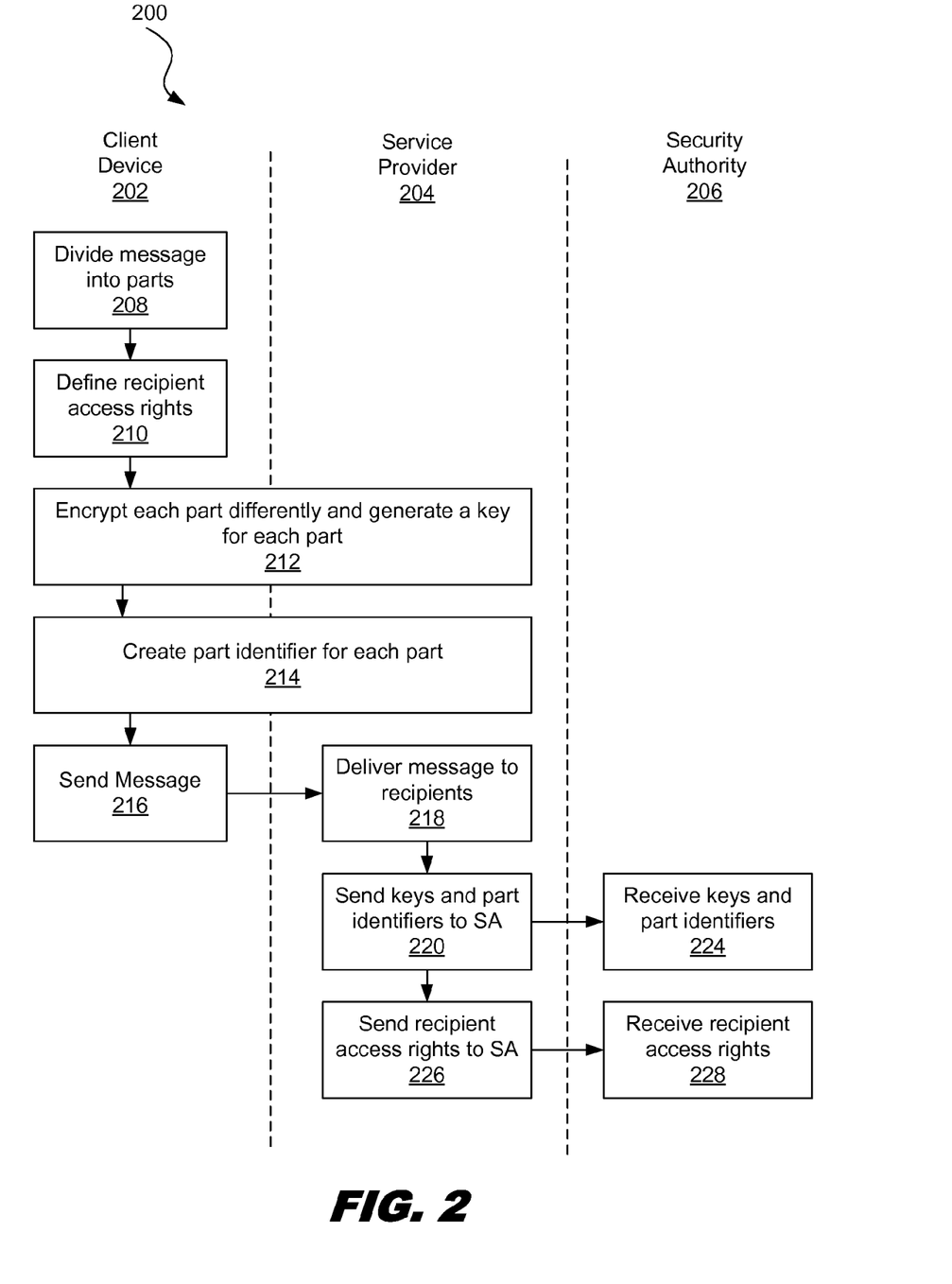
FIG. 2 is a flowchart showing an illustrative method for encrypting various parts of a message to be sent to multiple recipients, according to one example of principles described herein.

FIG. 2 is a flowchart showing an illustrative method 200 for encrypting various parts of a message to be sent to multiple recipients. According to the present example, the method includes steps performed by various entities. The entities include the client device 202, a service provider 204, and a security authority.

The client device 202 may be operated by a user that is sending a message to multiple recipients via a messaging service. The user may also be the author of the message. For example, the sender may be a laptop computing device that is connected to a network such as the Internet. The client device 202 may include a software application designed to use a messaging service provided by the service provider 204. For example, if the messaging service is an email service, then the client device 202 includes an email application or accesses an email application over the Internet.

The service provider 204 provides the message service to the client device 202 as well as other recipients. In some cases, recipients may be served by different service providers that are in communication with the service provider 204. Steps performed by the service provider may be performed by one or more servers under the control of the service provider 204. Some method steps may be performed by either a server associated with the service provider 204 or the client device 202.

The security authority 206 may be a different entity than the service provider 204. In some examples, however, the security authority 206 is under the control of the service provider 204. The security authority 206 maintains the keys (e.g., 106, FIG. 1) for various parts (e.g. 104, FIG. 1) of various messages. As will be explained in further detail below, an entity who wishes to view an encrypted part of a message has to get the key from the security authority 206.

According to the present example, the method 200 includes a step 208 for dividing a message into parts. The client device 202 receives information from a user associated with the client device 202 to divide the message into various parts. For example, the user may author the message and then divide the message up into parts. The user interface for providing the division of parts may be provided by the message application or by the service provider 204. As described above, a part may be a section of text, an image, an attachment, or other aspect of a message.

The method further includes a step 210 for defining recipient access rights. This information is received by the client device 202 from the user. The user identifies which recipients are allowed to access which parts. Some recipients may be allowed to access each part of the message which some recipients are only allowed to access a subset of the parts. In some cases, access rights may be defined by group. For example, some service providers allow for designations of groups, which include a list of recipients. A message sent to the group will thus be sent to each recipient in that group.

The method 200 further includes a step 212 for encrypting each part of the message and generating a key for each part. This step 212 may be performed by the client device 202 or a server associated with the service provider 204. Each part is encrypted with a different key. As described above, the encryption may be either a symmetric encryption mechanism or an asymmetric encryption mechanism. Either way, a key is generated for each part defined by the user.

In some examples, only certain parts of the message are encrypted. The parts that are encrypted can be designated by the sender. In some examples, however, the service provider may require that each part be encrypted, even if a part is to be sent to all recipients. This helps increase the security of messages sent by the service provider 104.

The method 200 further includes a step for creating a part identifier (e.g. 108, FIG. 1) for each part. This step 214 may be performed by the sender device 202 or a server associated with the service provider 204. As described above, the part identifier can be an alphanumeric value used to uniquely identify a part.

The method 200 further includes a step 216 for sending the message. Thus, when the user is ready for the message to be sent to the recipients, he or she can provide the client device 202 with the command to do so. The message may be sent to a server associated with the service provider. At step 218, the service provider delivers the message to all the intended recipients. In some cases, the recipients may also use the same service provider. In some examples, however, some recipients may have different service providers. Thus, delivering the message to such participants involves sending the message to the different service providers.

The method 200 further includes a step 220 for sending the keys and part identifiers to the security authority. In some examples, the keys and the part identifiers for each part within the message are associated with a message identifier that is used to uniquely identify the message to which the parts belong. The method 200 also includes a step 222 for sending the recipient access rights to the security authority.

The method 200 further includes a step performed by the security authority 206 for receiving the keys and part identifiers. At step 226, the security authority 206 receives the recipient access rights 226. The security authority then stores the keys, part identifiers, and recipient access rights in an appropriate manner.

Figure 3:
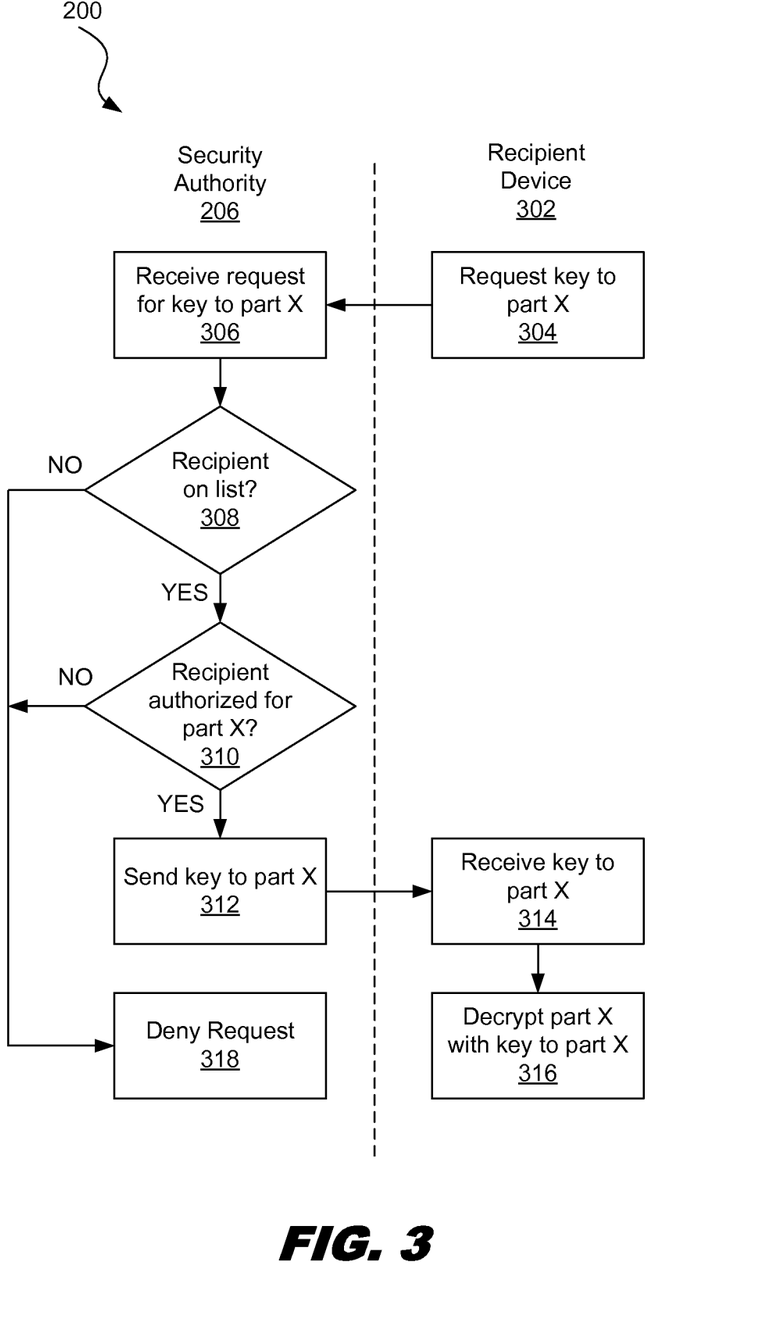
FIG. 3 is a flowchart showing an illustrative method for decrypting a received message, according to one example of principles described herein.

FIG. 3 is a flowchart showing an illustrative method for decrypting a received message. According to the present example, the method 300 includes steps performed by the security authority 206 and a recipient device 302 of a message. The recipient device 302 may be a client device associated with a user who is a recipient of the message having encrypted parts. The recipient may receive messages from either the same service provider as or a different service provider than the service provider associated with the user who sent the message.

The method 300 includes a step 304 performed by the recipient for requesting a key to part X. Part X may be one of many parts within a message received by the recipient 302. At step 306, the request for the key to part X is received by the security authority 206.

At step 308, the security authority determines whether the recipient is an authorized recipient on the list. The recipient may be identified through a variety of means. For example, if the messaging service is an email service, then the recipient can be identified by the recipients email address. Various security measures may be used to ensure that the recipient is in fact the recipient to whom the message was intended. If the recipient 302 is not on the list, then the request is denied at step 318.

If, however, the recipient is on the list, then the method proceeds to the next step. At step 310, it is then determined whether the recipient is authorized for part X. It may be the case that the recipient is on the list but not authorized to view part X. In such case, the method proceeds to step 318 at which the request is denied.

If, however, the recipient 302 is authorized for part X, then the method 300 proceeds to the next step. At step 312, the security authority sends the key to part X to the recipient. At step 314, the recipient 302 receives the key to part X. At step 316, the recipient 302 uses the key to decrypt part X. The recipient can then view the message.

Using principles described herein, a sender of a message can maintain security of the message after the message has been sent. For example, if the recipient 302 were to forward the message to another person who is not on the recipient list, that other person would not be able to view the message because the request for the key would be denied by the security authority. Moreover, the sender is able to send a single message to multiple recipients or multiple groups or recipients without having to create a different message for each recipient or each group. Rather, by only allowing certain parts to be available to particular recipients or groups or recipients, the sender can send a single message with variations to different groups instead of sending multiple slightly different messages to the multiple recipients.

Figure 4:
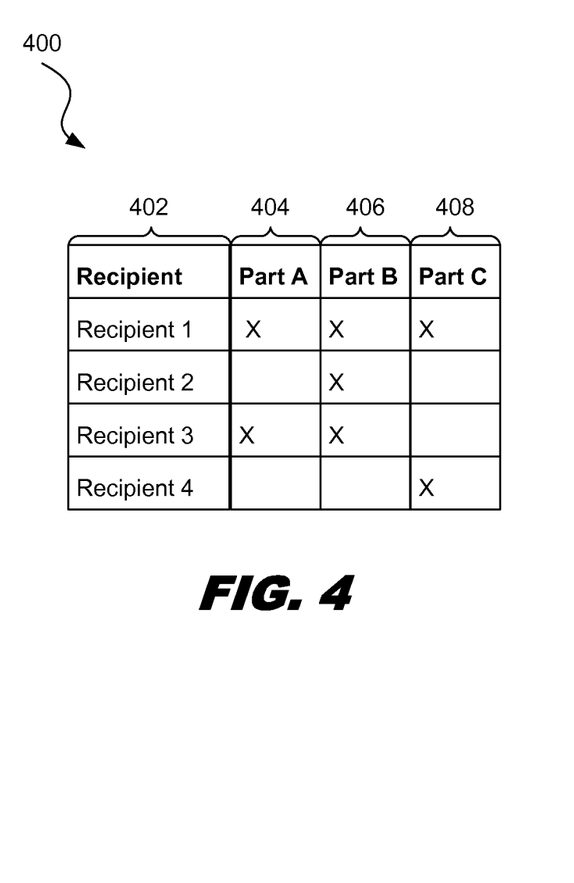
FIG. 4 is a diagram showing an illustrative recipient access privilege list, according to one example of principles described herein.

FIG. 4 is a diagram showing an illustrative recipient access privilege list 400. The list 400 is used by the security authority to determine which recipients have access to which parts of the message. In this example, there are four recipients listed in the recipient column 402. In some examples, each recipient may correspond to a list of recipients. For example, a recipient may be a group within an organization that has its own email list. There are also three parts in the message associated with the list 400. Part A is represented in column 404, part B is represented in column 406, and part C is represented in column 408.

For each recipient, an X in a column indicates the user is authorized to view the part associated with that column. In the present example, recipient 1 is authorized to view all parts. Recipient 2 is authorized to view part B only. Recipient 3 is authorized to view part A and part B. Recipient 4 is authorized to view part C only. Thus, if recipient 4 attempted to access part B or part A, the request for the key would be denied by the security authority (e.g. 206, FIG. 3).

The user may define the recipient access privilege list in a variety of ways. For example, after dividing the content of a message into parts, the user may start with a list of recipients having a default privilege of not being able to access any part of the message. For each recipient, the user can then indicate the parts each recipient is authorized to view. Alternatively, the user may start with a list of recipients having a default privilege of being able to access all parts of the message. For each recipient, the user can then indicate the parts each recipient is not authorized to view.

Figure 5:
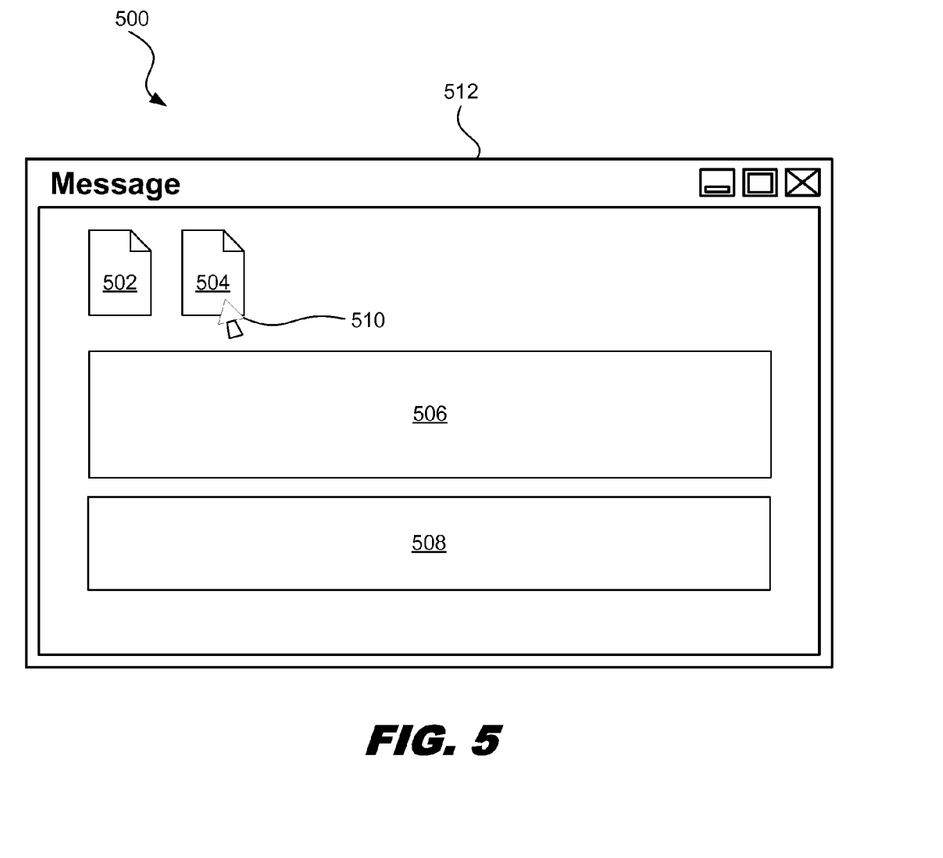
FIG. 5 is a diagram showing an illustrative user interface for sending a message with multiple encrypted parts to a plurality of recipients, according to one example of principles described herein.

FIG. 5 is a diagram showing an illustrative user interface. According to the present example, the user interface 500 displays a message window 512 to a sender of a message. The sender may also be the author of the message. In this example, the message includes two attachments 502 and two paragraphs 506, 508 of text.

In one example, the sender may select a particular attachment and identify that attachment as being its own part. For example, the user may use a cursor 510 to select the icon representing the first attachment 502 and bring up a menu associated with that first attachment. The menu may include an option to identify that attachment as its own part. The user may also identify the second attachment 504 as its own part. For example, the first attachment may be denoted as part A and the second attachment may be denoted as part B. Alternatively, the user may identify the second attachment 504 as being of the same part as the first attachment 502. For example, both attachments 502, 504 can be denoted as part A.

Similarly, a user may use the cursor to select portions of text. In this example, the portions of text are separated by paragraphs. But, in some cases, the user can select more specific portions of text such as sentences or words and identify them as being with a certain part. The paragraphs 506 may be associated with their own parts or they may be assigned to the same part. For example, the first paragraph 506 may be denoted as part C and the second paragraph 508 may be denoted as part D. Or, both paragraphs 506, 508 may be denoted as part C.

In a more specific example, a user intends to send the message to everyone within an organization. But, the first attachment 502 is only intended for upper management and the second attachment 504 is intended for both middle management as well as upper management. Furthermore, the first paragraph 506 is intended for everyone and the second paragraph 508 is intended only for the accounting department. In such a case, the user would divide the message into four parts. Part A corresponds to the first attachment 502, part B corresponds to the second attachment 504, part C corresponds to the first paragraph 506, and part D corresponds to the second paragraph 508.

Then, the user defines the recipient access list. Specifically, the user identifies recipient 1 as corresponding to upper management, recipient 2 as corresponding to middle management, recipient 3 as accounting, and recipient 4 as everyone else. Recipient 1 (upper management) is then given access privileges to all parts. Recipient 2 (middle management) is given access privileges to all parts except part A (first attachment). Recipient 3 (accounting) is given access privileges to parts C and D (paragraphs 506, 508), and Recipient 4 is given access privileges to only part C (first paragraph 506).

When the recipients receive their respective messages, each part of the message will be present. But, each part will be encrypted. When requesting encryption keys from the security authority, only the parts for which that recipient is authorized to access. For example, if someone from the recipient 4 group attempts to get the security key for parts A, B, or D, that request will be denied by the security authority.

In one example, a message client (e.g., an email client) of the recipient may perform the steps of requesting the encryption keys for each part of the message automatically without instruction from the user. Thus, the recipient will receive a message that displays only the decrypted portions without necessarily knowing that the message includes encrypted portions for which that recipient is not authorized to access.

Figure 6:
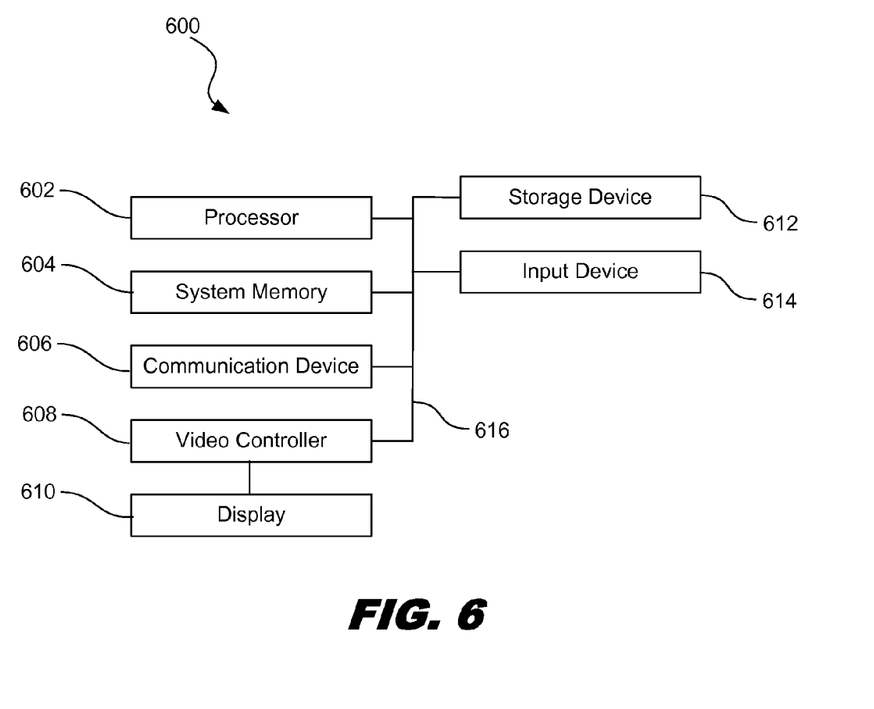
FIG. 6 is diagram showing an illustrative computing system that can be used for encrypting parts of a message for multiple recipients, according to one example of principles described herein.

FIG. 6 is diagram showing an illustrative computing system that can be used for encrypting parts of a message for multiple recipients. The computing system 600 may be a client device that sends or receives a message. The computing system 600 may also be a server associated with a service provider. The computing system 600 may also be a server associated with the security authority. According to the present example, the computing system 600 includes a processor 602, an input device 614, a storage device 612, a video controller 608, a system memory 604, a display 610, and a communication device 606, all of which are interconnected by one or more buses 616.

The storage device 612 may include a computer readable medium that can store data. The storage device 612 may include volatile memory storage devices such as Random Access Memory (RAM) as well as non-volatile memory storage devices such as solid state memory components. The computer readable medium may be a non-transitory tangible media.

In some examples, the communication device 606 may include a modem, network card, or any other device to enable the computing system 600 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 600 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 604, and/or any combination thereof, may be executed by a processor 602 to cause the processor 602 to carry out or implement in whole or in part the operation of the computing system 600, one or more of the methods. In some examples, such a processor 602 may execute the plurality of instructions in connection with a virtual computer system.

Some examples of processing systems described herein may include non-transitory, tangible, machine readable media that include executable code that when run by one or more processors (e.g., processor 602) may cause the one or more processors to perform the processes of methods 200 and 300 as described above. Some common forms of machine readable media that may include the processes of method for example, floppy disk, flexible disk, hard disk, magnetic tape, any other magnetic medium, an optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   with a computing system of an e-mail service provider, receiving instructions from a client device of a user to divide content of an e-mail message into a plurality of parts;
   with the computing system, generating and assigning alpha-numeric part identifiers to each of the plurality of parts;
   with the computing system, encrypting each of the plurality of parts with a different encryption key;
   with the computing system, receiving, from the client device of the user, a list of recipients of the e-mail message and access privilege data associated with each recipient in the list, the access privilege data indicating which of the plurality of parts each recipient is authorized to access, wherein each recipient is a group within an organization where each group contains an email list;
   with the computing system, transmitting the e-mail message to each of the recipients without creating multiple different e-mail messages for each of the recipients;
   with the computing system, transmitting the access privilege data, the different encryption key for each of the plurality of parts, and the part identifier for each of the plurality of parts to a server of a security authority;
   with the server, receiving a request from a client device of a recipient from the list of recipients of the email message to decrypt the e-mail message, the request including the part identifiers for the plurality of parts;
   with the server, based on the part identifiers and the access privilege data, transmitting to the client device of the recipient an encryption key for a part the recipient is authorized to view and withholding an encryption key for a part the recipient is not authorized to view without notifying the recipient that the encryption key for the part the recipient is not authorized to view is being withheld;
   with the server, receiving, from a client device of an additional user to whom the e-mail message has been forwarded, a request for an encryption key for a first part of the plurality of parts from the e-mail message and an encryption key for a second part of the plurality of parts from the email message, the additional user being different from any recipient on the list of recipients; and
   in response to determining that the additional user is not authorized to view the first part, based on the access privilege data and the part identifier for the first part, withholding the encryption key for the first part.

2. The method of claim 1, further comprising:
   receiving the e-mail message;
   transmitting the e-mail message to each of the plurality of recipients;
   receiving the access privilege data, the different encryption key for each of the plurality of parts, and the part identifiers for each of the plurality of parts;
   transmitting the access privilege data, the different encryption key for each of the plurality of parts, and the part identifiers for each of the plurality of parts to the security authority.

3. The method of claim 1, wherein a first part of the plurality of parts is a file.

4. The method of claim 1, wherein a first part of the plurality of parts is a portion of text within the e-mail message.

5. The method of claim 1, wherein different recipients have different access privileges to different parts of the e-mail message.

6. The method of claim 1, wherein for the recipient to access a part of the encrypted e-mail message, obtaining the encryption key for that part from the security authority.

7. The method of claim 6, wherein the recipient receives the encryption key for that part when the recipient is authorized for that part.

8. A method comprising:
   with a server of a security authority, receiving a different encryption key for each of a plurality of parts of an encrypted e-mail message from a computing system of an e-mail service provider, the encrypted e-mail message having a plurality of recipients, wherein each recipient of the plurality of recipients is a group within an organization where each group contains an email list, wherein the plurality of recipients do not receive different encrypted e-mail messages;
   with the server, receiving a generated alpha-numeric part identifier for each of the plurality of parts of the encrypted e-mail message;
   with the server, receiving access privileges for a first recipient of the plurality of recipients, the access privileges for the first recipient identifying which parts of the encrypted e-mail message the first recipient is authorized to access;
   with the server, receiving, from a client device of the first recipient, a request for an encryption key for a first part of the plurality of parts from the encrypted e-mail message and an encryption key for a second part of the plurality of parts from the encrypted email message;
   in response to determining, based on the access privileges and the part identifier for the first part, that the first recipient is authorized to view the first part, transmitting to the recipient the encryption key for the first part;
   in response to determining, based on the access privileges and the part identifier for the second part, that the first recipient is not authorized to view the second part, withholding the encryption key for the second part;
   with the server, receiving, from a client device of an additional user to whom the e-mail message has been forwarded, a request for the encryption key for the first part of the plurality of parts from the encrypted e-mail message and the encryption key for the second part of the plurality of parts from the encrypted email message, the additional user being different from any recipient on the list of recipients; and
   in response to determining that the additional user is not authorized to view the first part, based on the access privileges and the part identifier for the first part, withholding the encryption key for the first part.

9. The method of claim 8, further comprising:
   determining, based on the access privileges for the first recipient, that the first recipient is authorized to access the first part; and
   sending the encryption key for the first part to the encrypted e-mail message to the first recipient.

10. The method of claim 8, further comprising, receiving access privileges for a second recipient of the plurality of recipients, the access privileges for the second recipient identifying which parts of the encrypted e-mail message the second recipient is authorized to access, the access privileges for the second recipient being different than the access privileges for the first recipient.

11. The method of claim 10, further comprising, receiving, from the second recipient, a request for the encryption key for the first part of the plurality of parts from the encrypted e-mail message.

12. The method of claim 11, further comprising, determining, based on the access privileges for the second recipient, that the second recipient is not authorized to access the first part; and denying the request from the second recipient.

13. The method of claim 8, further comprising, receiving a request, from an entity that is not a recipient of the encrypted e-mail message, for the encryption key for the first part of the encrypted e-mail message; and denying the request from the entity.

14. The method of claim 8, wherein the first part is a file that is configured as an attachment to the encrypted e-mail message.

15. The method of claim 8, wherein the first part is a portion of text within the encrypted e-mail message.

16. A method performed by a computing system, the method comprising:

receiving from a client device of a user, a plurality of content parts of an e-mail message;

generating and assigning to each of the plurality of content parts, a part identifier that uniquely identifies one of the content parts with an alpha-numeric value;

associating with each of the plurality of content parts, a different encryption key;

receiving, from the client device of the user, a list of recipients of the e-mail message and access privilege data associated with each recipient of a plurality of recipients in the list, the access privilege data indicating which of the plurality of content parts each recipient is authorized to access, wherein each recipient is a group within an organization where each group contains an email list;

transmitting the e-mail message to a server without sending multiple different e-mail messages to the server;

transmitting the access privilege data, the different encryption key for each of the plurality of content parts, and the part identifier for each of the plurality of content parts to a server of a security authority;

with the server, receiving a request from a client device of a recipient of the list of recipients to decrypt the e-mail message, the request including the part identifier for each of the plurality of content parts;

with the server, based on the part identifier and the access privilege data, transmitting to the client device of the recipient an encryption key for a part the recipient is authorized to view and withholding an encryption key for a part the recipient is not authorized to view;

with the server, receiving another request from a client device of an additional user to whom the e-mail message has been forwarded, the another request including the part identifier for each of the plurality of content parts, the additional user being different from any recipient on the list of recipients; and with the server, based on the part identifier and the access privilege data, withholding an encryption key for a part the additional user is not authorized to view.

17. The method of claim 16, further comprising:

with the server, encrypting each of the plurality of content parts using the different encryption key associated with that content part; and transmitting the e-mail message to the plurality of recipients.

18. The method of claim 16, further comprising, with the security authority;

receiving the access privilege data, the different encryption key for each of the content parts, and the part identifier for each of the content parts;

receiving, from the client device of the first recipient, a request for an encryption key for a first part of the plurality of content parts from the e-mail message; and in response to determining that the first recipient is authorized to view the part, providing the first recipient with the encryption key for the first part.

\* \* \* \* \*